United States Patent
Hirata

[11] Patent Number: 5,964,467
[45] Date of Patent: Oct. 12, 1999

[54] OIL CONTROL RING OF TWO PIECE TYPE FOR INTERNAL COMBUSTION ENGINE

[75] Inventor: Shinichi Hirata, Kashiwazaki, Japan

[73] Assignee: Riken Corporation, Tokyo, Japan

[21] Appl. No.: 08/958,538

[22] Filed: Oct. 27, 1997

[30] Foreign Application Priority Data

Oct. 31, 1996 [JP] Japan ................................. P8-290085

[51] Int. Cl.$^6$ .............................. B60T 11/236; F02F 5/00; F16J 9/06; F16J 9/20
[52] U.S. Cl. .......................... 277/447; 277/474; 277/476; 277/478
[58] Field of Search .................................... 277/434, 447, 277/467, 472, 474, 476, 477, 478

[56] References Cited

U.S. PATENT DOCUMENTS

| | | | |
|---|---|---|---|
| 2,817,565 | 12/1957 | Heiss | 277/478 |
| 2,833,604 | 5/1958 | Hunt | 277/478 |
| 2,859,079 | 11/1958 | Olson | 277/477 |
| 2,999,728 | 9/1961 | Estey | 277/478 |
| 3,191,947 | 6/1965 | Hamm | 277/477 |
| 3,477,732 | 11/1969 | Warrick | 277/478 |
| 3,628,800 | 12/1971 | Prasse | 277/477 X |
| 3,741,569 | 6/1973 | Mayhew | 277/477 |

FOREIGN PATENT DOCUMENTS

| | | |
|---|---|---|
| 544459 | 6/1993 | European Pat. Off. . |
| 1169347 | 12/1958 | France . |
| 2382633 | 9/1978 | France . |

*Primary Examiner*—James R. Brittain
*Assistant Examiner*—Gary Grafel
*Attorney, Agent, or Firm*—Bachman & LaPointe, P.C.

[57] ABSTRACT

The oil control ring 1 is provided to attach in an annular groove 10 formed in a piston 2 for internal combustion engine. The spacer expander 4 comprises a base 8, a plurality of supports 6 and a plurality of arms 7. The supports 6 and arms 7 are integrally formed with the base 8 to extend from an outer periphery 8$a$ or inner periphery 8$b$ of the base 8. The supports 6 resiliently urge a side rail 5 mounted on the space expander 4 toward an upper surface 14 of the annular groove 10 so that during upward stroke of the piston 2, the supports 6 can be resiliently deformed to form between the side rail 5 and upper surface 14 of the groove 10 a radial passage through which oil scraped by the side rail can be drained. Each arm 7 is provided with a lug 8 to resiliently urge the side rail 5 in radial and outward direction.

4 Claims, 5 Drawing Sheets

20

OIL CONTROL RING OF TWO PIECE TYPE FOR INTERNAL COMBUSTION ENGINE

The present invention relates to an oil control ring for restricting amount of oil that flows into combustion chamber, in particular for a high speed internal combustion engine such as a gasoline engine.

BACKGROUND OF THE INVENTION

An oil control ring is attached in an annular groove formed on a cylindrical surface of a piston, and is brought into contact with an inner wall of a cylinder to restrict amount of oil that flows into combustion chamber during operation of an engine. An oil ring so called as "two piece type" comprises a space expander and a side rail supported thereon as shown in Japanese Patent Publication Nos. 2-2512 and 3-61860 and U.S. Pat. No. 5,052,698. Such an oil ring of two piece type is disadvantageous in that the spacer expander of the oil control ring is so rigid that during operation of the engine the side rail cannot strictly follow a deformed bore of the cylinder at an elevated temperature, thus resulting in insufficient follow-up property of the side rail in a circumferential direction of the side rail. The insufficient follow-up property of the side rail allows to produce, between the side rail and the inner wall of the cylinder during operation of the engine, radial clearance or gap which increases amount of oil entering a combustion chamber for increase of oil consumption. Therefore, in some cases, the engine cannot generate full power due to increase of oil amount entering the combustion chamber or may produce trouble in operation. In particular, oil control rings shown in Japanese Patent Publication No. 3-61860 and U.S. Pat. No. 5052698, the spacer expander indicates very little deflection during reciprocal motion of the piston because of high rigidity of the space expander so that an inner periphery of the side rail always closely contacts an upper surface of the annular groove formed on the piston. Accordingly, no radial passage is formed between the side rail and the upper surface of the annular groove during the upward stroke of the piston, and the oil scraped by the side rail cannot be drained inside the side rail, thus resulting in increase of oil consumption.

A typical oil control ring of three piece type mainly applied to current internal combustion engines, comprises a space expander and a pair of side rails positioned on and beneath the space expander. However, it is very difficult to manufacture oil control rings of three piece type in such thin structure as recent high speed and light weight engines require.

Accordingly, prior art oil control rings indicate various defects. Firstly, high rigidity of the spacer expander causes insufficient contact of the side rail with an inner wall of a cylinder along the outer periphery of the side rail due to deformation of the cylinder bore at an elevated temperature. Secondly, the spacer expander does not produce deflection in the sliding direction so that the inner periphery of the side rail is always kept in close contact to an upper surface of the annular groove formed on the cylinder during upward stroke of the piston, and therefore no radial passage can be formed between the side rail and upper surface of the annular groove to drain oil scraped by the side rail. Thirdly, oil control rings cannot be made into thin structure in accordance with requirement of light weight and high speed engines.

Accordingly, an object of the present invention is to provide an oil control ring of two piece type made in thin structure.

Another object of the invention is to provide an oil control ring capable of producing a radial passage between a side rail and an upper surface of an annular groove of a piston during the upward stroke to drain oil scraped by the side rail through the radial passage.

Still another object of the invention is to provide an oil control ring having a side rail which is kept in close contact to an inner wall of a cylinder.

A further object of the invention is to provide an oil control ring which can form a radial passage between a side rail and an upper surface of the annular groove during upward stroke of the piston due to deflection of supports of a spacer expander to drain oil scraped by the side rail into a crank chamber.

Still further object of the invention is to provide an oil control ring operable with reduced oil consumption.

SUMMARY OF THE INVENTION

The oil control ring according to the present invention is adapted to be attached in an annular groove formed in a piston for internal combustion engine. The oil control ring includes a spacer expander and a side rail mounted thereon and urged toward an inner wall of a cylinder by elastic force of the spacer expander. The spacer expander comprises a base, a plurality of supports and a plurality of arms. The supports and arms are integrally formed with the base to extend from an inner periphery or outer periphery of the base. The supports resiliently urges the side rail toward an upper surface of the annular groove of the piston. Each of the arms is provided with a lug for resiliently urging the side rail in radial and outward direction.

During operation, the support of the spacer expander can resiliently be deformed to produce a radial passage between the side rail and upper surface of the annular groove of the piston during the upward stroke of the piston by frictional force between the side rail and inner wall of the cylinder to drain oil scraped by the side rail through the radial passage and an opening. The base of the spacer expander is formed with its flat bottom surface which stably retains the space expander on the bottom surface of the annular groove of the piston.

In embodiment of the present invention, the base of the spacer expander is in contact with a bottom surface of the annular groove of the piston. Each of the supports is formed into a V-shape which comprises a spring portion and a table portion connected with an end of the spring portion. The spring portion obliquely extends from the inner periphery or outer periphery of the base. The table portion is substantially in parallel relation to the upper surface of the annular groove to uniformly urge the side rail throughout the whole circumference toward the upper surface of the annular groove. Each of the arms extends from the inner periphery or outer periphery of the base independently of the supports so that the lugs are in contact with the inner periphery of the side rail to radially outwardly expand the side rail. The outer periphery of each side rail is radially protruded outwardly of the spacer expander.

Each lug has an inclined surface up to 30 degrees relative to a vertical direction. The combined width of the spacer expander and side rail is in a range of 1 millimeter to 4 millimeters. An outer periphery of the table portion contacted with a bottom surface of the side rail is positioned 10 to 60% from the outer periphery of the side rail in view of the total width of the oil control ring. The spring portion of the support is so compressed during the upward stroke of the piston that the outer periphery of the table portion is lowered below the inner periphery of the table portion to maintain the inner periphery of the side rail above the outer periphery of the side rail. The supports and arms are extended from the outer periphery or inner periphery of the base, and the spring portions are extended from the inner periphery of the base in an intersecting condition of the spring portion in a projection view with the arms extended from the outer periphery of the base. The space expander has a Z section including the base and supports. The supports can resiliently be deformed during the upward stroke of the piston by frictional force between the side rail and inner wall of the cylinder to produce a radial passage between the side rail and upper surface of the annular groove of the piston to drain oil scraped by the side rail through the radial passage.

BRIEF DESCRIPTION OF THE DRAWINGS

A more complete understanding of the present invention may be derived by reference to the detailed description and the claims when considered together with the accompanying drawings wherein:

DETAILED DESCRIPTION OF THE INVENTION

Embodiments of the present invention will be described hereinafter.

Figure 1:
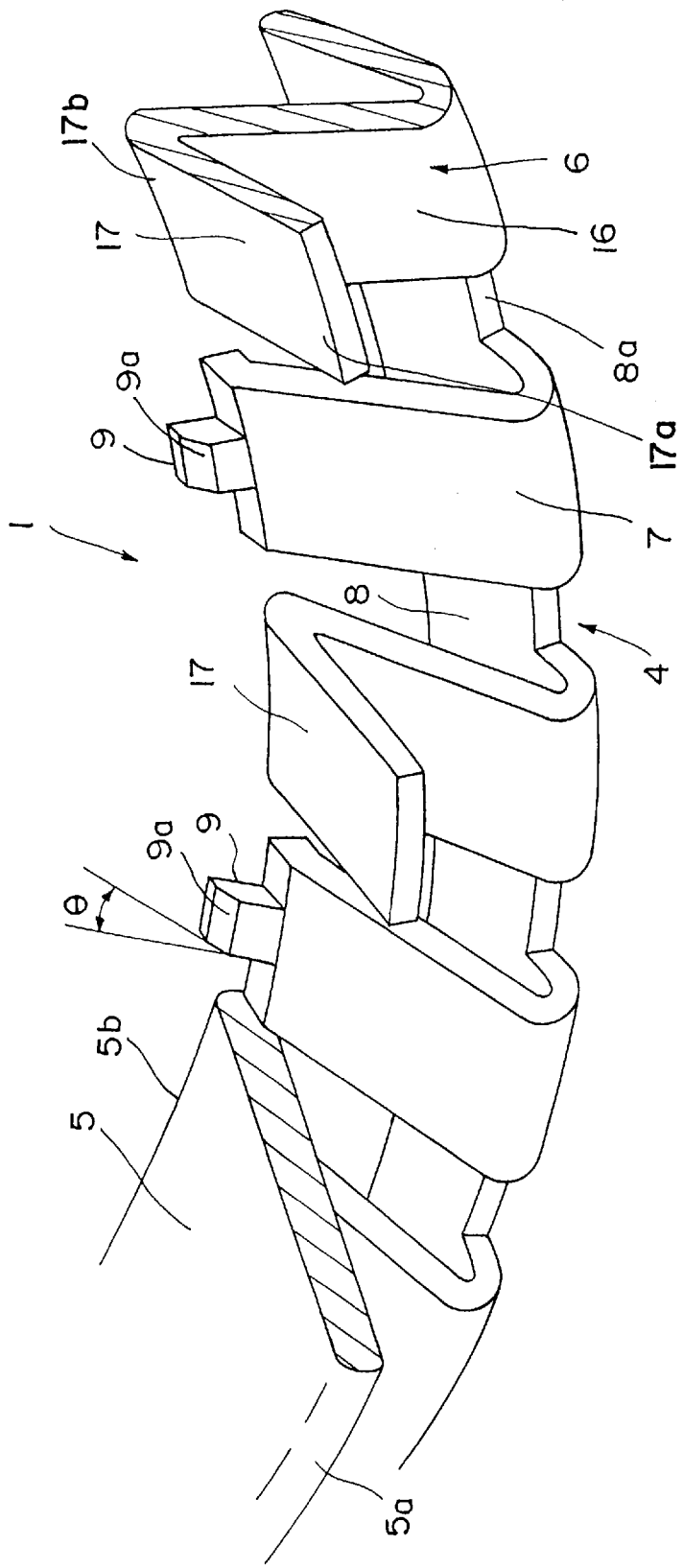
FIG. 1 is a partial perspective view of an oil control ring for internal combustion engine according to the present invention.
Figure 2:
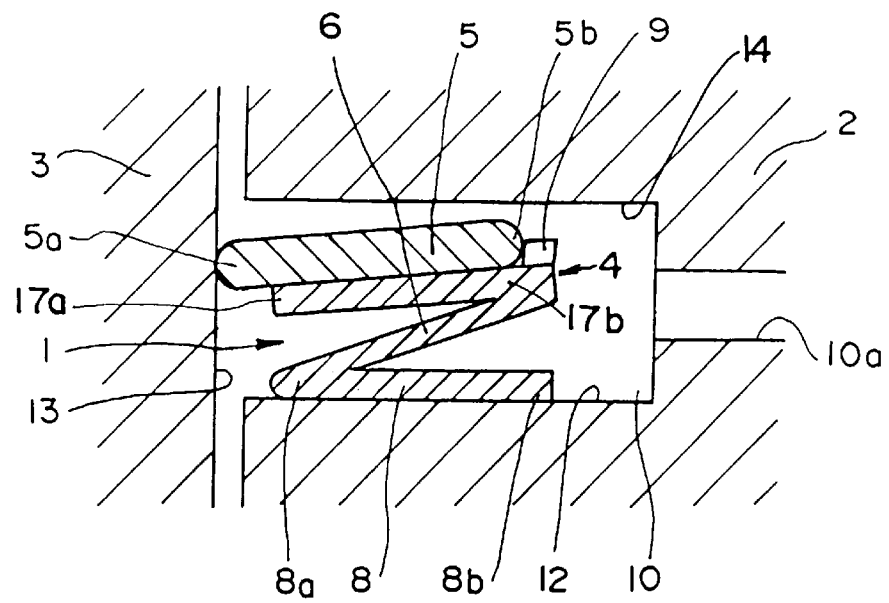
FIG. 2 is a partial sectional view of the oil control ring of the present invention attached to an annular groove formed on a cylindrical surface of a piston.

Referring to FIG. 2, the oil control ring 1 according to the present invention is disposed in an annular groove 10 formed on a circumferential surface of a piston 2 for internal combustion engine. As shown in FIG. 1, the oil control ring 1 includes an annular spacer expander 4, and an annular flat side rail 5 positioned on the spacer expander 4 to form a two piece structure. The spacer expander 4 comprises a base 8 formed with its flat bottom surface in contact with a bottom surface 12 of the annular groove 10 of the piston 2; a plurality of supports 6 upwardly and obliquely extending from an outer periphery 8a of the base 8; and a plurality of arms 7 upwardly and obliquely from the outer periphery 8a of the base 8 substantially in parallel relation to and independently of the spring portion 16 of the supports 6. The supports 6 and arms 7 are integrally formed of steel or other metal with the base 8 to extend above a same upper side of the base 8 so that the oil control ring 1 can be formed in its thin structure. Each of the supports 6 is formed into a V-shape which comprises a spring portion 16 and a table portion 17 connected with an end of the spring portion 16 to form a Z-shaped section with the base 8.

The spring portion 16 diagonally extends from the outer periphery 8a of the base 8 within the annular groove 10. The table portion 17 is substantially in parallel relation to the upper surface 14 of the annular groove 10 to uniformly urge the side rail 5 throughout the whole circumference toward the upper surface 14 of the annular groove 10. Each of the arms 7 extends from the inner periphery or outer periphery of the base 8 independently of the supports 6 so that the lug 9 is in contact with the inner periphery 5b of the side rail 5 and produces its elastic force to radially outwardly expand the side rail 5. The side rail 5 is positioned on the table portion 17 so that the supports 6 resiliently upwardly urges the side rail 5 toward an upper surface 14 of the annular groove 10 of the piston 2. Of course, the table portion 17 may also produce resilient force to elastically urge the side rail 5 toward the upper surface 14 of the groove 10 of the piston 2 in addition to the spring portion 16. The flat bottom surface of the base 8 stably retains the space expander 4 on the bottom surface 12 of the annular groove 10 of the piston 2, and the flat bottom surface of the base 8 reduces wear of the bottom surface 12 of the groove 10. The side rail 5 is resiliently urged toward an inner wall 13 of a cylinder 3 by elastic force of the spacer expander 4. An outer periphery 5a of the side rail 5 is protruded outwardly of the spacer expander 4 to contact the inner wall 13. Not shown but, each of the spacer expander 4 and side rail 5 has a closed gap to attach them in the annular groove 10. A radial opening 10a is formed to communicate the annular groove 10 of the piston 2 with a crank chamber for return of oil.

Each of the arms 7 is provided with a lug 9 which has an inclined surface 9a in contact to an inner periphery 15 of the side rail 5 to outwardly resiliently urge the side rail 5 toward the inner wall 13 of the cylinder 3. In fact, the inner periphery of the side rail 5 is radially outwardly and upwardly pushed by the inclined surface 9a which forms an angle e up to 30 degrees relative to a vertical direction. The bottom portion of each lug 9 is positioned approximately at a same level as that of an upper surface of the table portion 17. The combined width of the spacer expander 4 and side rail 5 is in a range of 1 millimeter to 4 millimeters.

The support 6 of the spacer expander 4 may have its sectional area, shape and length to provide appropriate rigidity and deflection of the support 6 so that during the upward stroke of the piston 2 it can be deformed to produce a radial passage between the side rail 5 and upper surface of the annular groove 10 of the piston 2, and therefore oil scraped by the side rail 5 can be drained through the radial passage and the opening 10a. Specifically, the flexural rigidity Rf is shown as Rf=EI where "I" is the principal moment of inertia of area in the support 6, and "E" is Young's modulus or modulus of longitudinal elasticity of the support 6. Accordingly, the flexural rigidity of the support 6 may be varied by adopting different section area, shape and length of the spring portion 16 and table portion 17. In addition, deflection amount of the support 6 depends on its protrudent length from the base 8. The elastic deflection amount of the support 6 is represented by the deflection of the spring portion 16 plus deflection of the table portion 17. These spring portions 16 and table portions 17 are formed into V-shape to generate given elasticity, rigidity and deflection in the sliding direction during upward stroke of the piston 2 so that the spacer expander 4 is sufficiently deflected by frictional force between the side rail 5 and inner wall 13 of the cylinder 3 to form a radial passage of sufficient area between the side rail 5 and the upper surface 14 of the annular groove 10. Accordingly, during the upward stroke of the piston 2, oil scraped by the side rail 5 can be drained through the radial passage formed between the side rail 5 and the upper surface of the annular groove 10 and through the opening 10a communicated with the crank chamber.

The side rail 5 is resiliently outwardly urged by the lugs 9 formed in the arm 7 independently of the supports 6 so that the side rail 5 can be brought into close contact with the inner wall 13 of the cylinder 3 to provide sufficient seal to the inner wall 13, and therefore, the outer periphery 5a of the side rail 5 can follow thermal deformation of the cylinder 3 at an elevated temperature. This means that the supports 6 provide good follow-up property in response to thermal deformation of the cylinder bore during operation of the engine.

Figure 3:
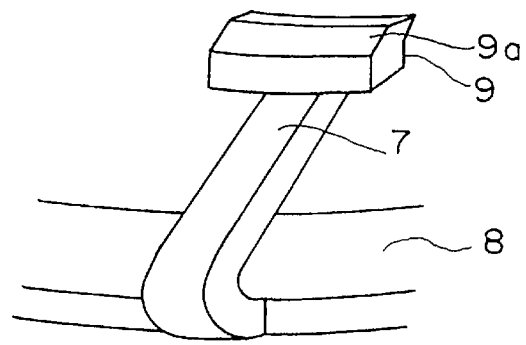
FIG. 3 is a partial perspective view of an arm in a second embodiment of the present invention.
Figure 4:
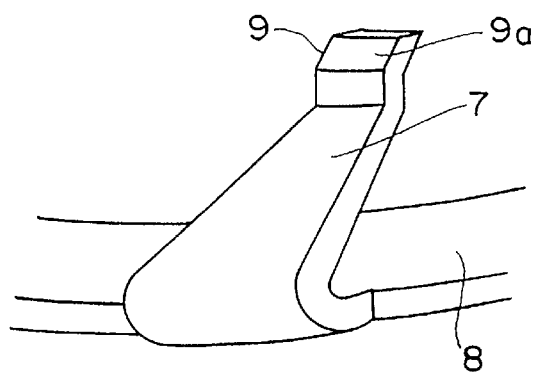
FIG. 4 is a partial perspective view of an arm in a third embodiment of the present invention.
Figure 5:
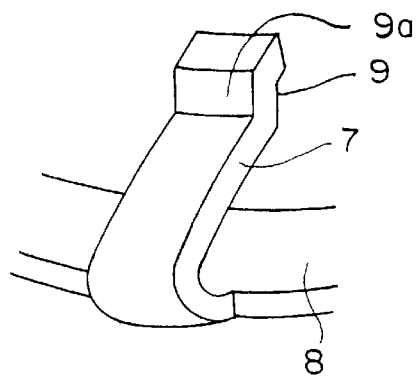
FIG. 5 is a partial perspective view of an arm in a fourth embodiment of the present invention.
Figure 6:
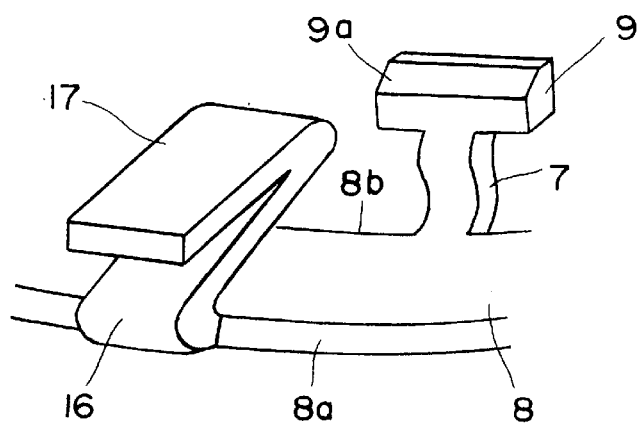
FIG. 6 is a partial perspective view of an arm in a fifth embodiment of the present invention.
Figure 7:
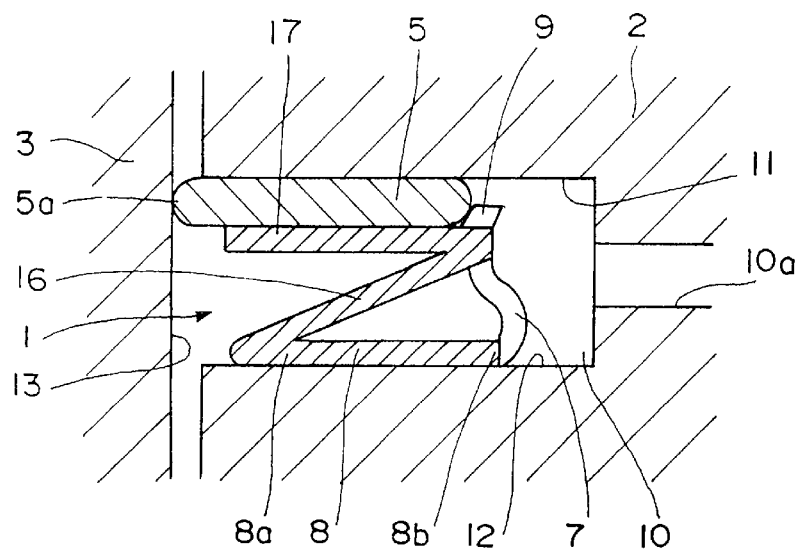
FIG. 7 is a sectional view of the fifth embodiment shown in FIG. 6.
Figure 8:
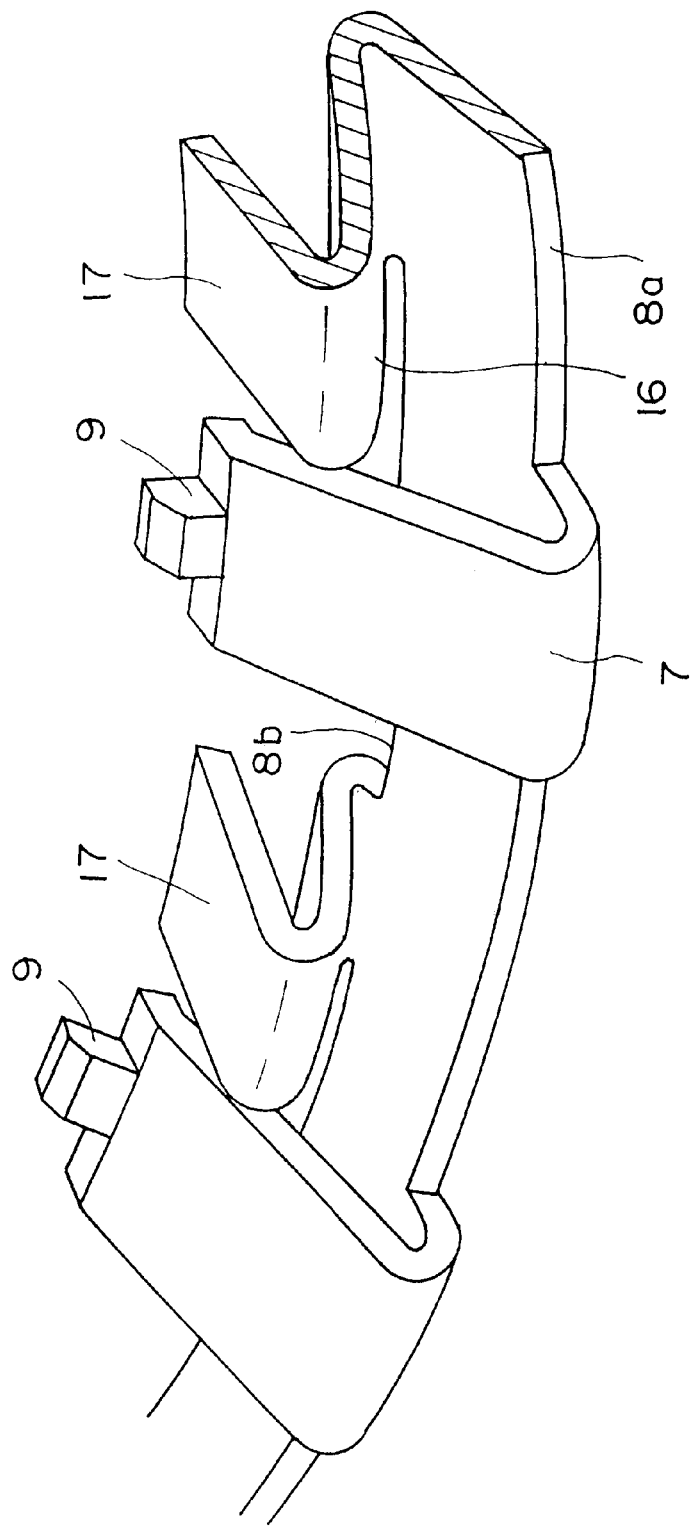
FIG. 8 is a partial perspective view of a sixth embodiment of the oil control ring according to the present invention.
Figure 9:
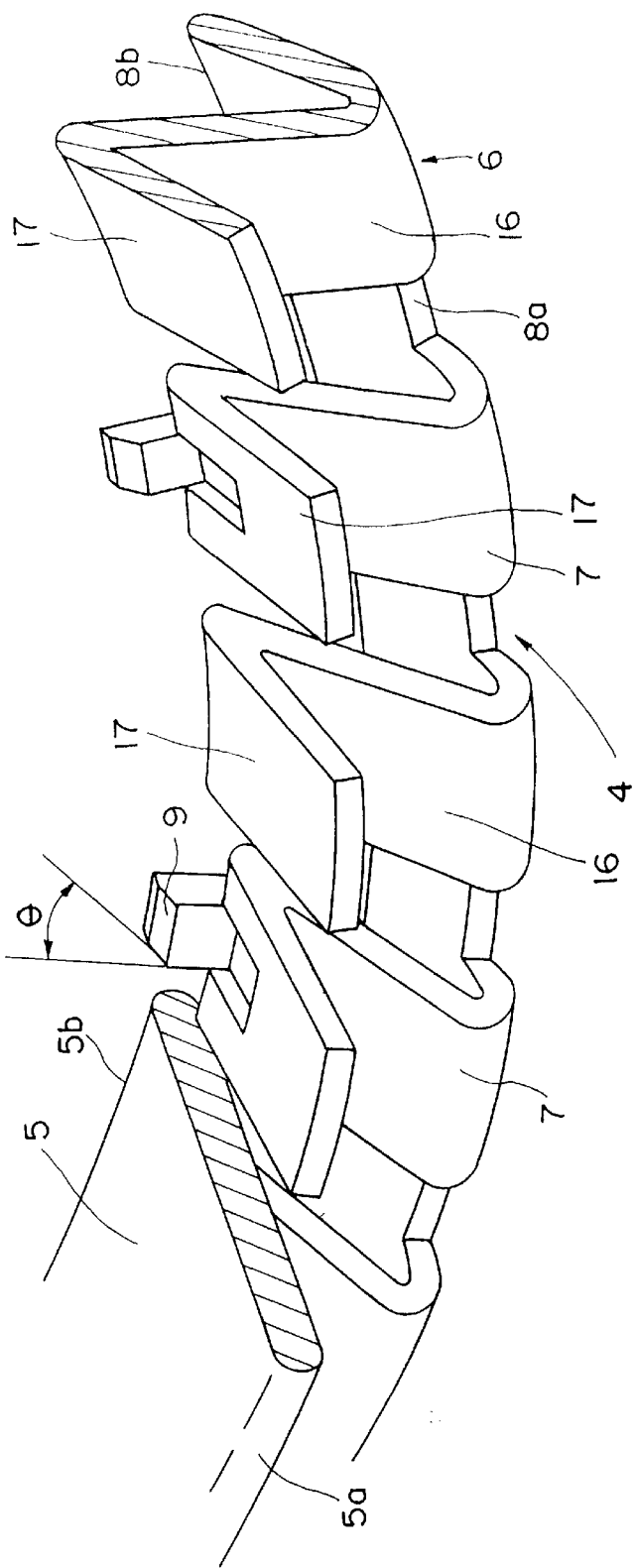
FIG. 9 is a partial perspective view of a seventh embodiment of the oil control ring according to the present invention.

The spring portion 16 of the support 6 is so compressed during the upward stroke of the piston 2 that the outer periphery 17a of the table portion 17 may be lowered below the inner periphery 17b of the table portion 17 to maintain the inner periphery 5b of the side rail 5 above the outer periphery 5a of the side rail 5. In this case, the side rail 5 is supported on two portions of the outer periphery 17a of the table portion 17 and the lug 9. Where "T" in FIG. 2 indicates the whole width of the oil control ring 1, and "t" indicates length from the outer periphery 5a to the outer periphery 17a of the table portion 17, (t/T)×100=10 to 60%. In other words, the outer periphery 17a of the table portion 17 contacted with the bottom surface of the side rail 5 is preferably positioned 10 to 60% from the outer periphery 5a of the side rail 5 in view of the total width T of the oil control ring 1. FIG. 3 shows a second embodiment of then arm 7 according to the present invention wherein the arm 7 is formed into a thin section of substantially same width, but the lug 9 can be formed with its greater wide than that of the arm 7. In FIG. 4 demonstrating a third embodiment of the present invention, the arm 7 and lug 9 can be tapered. FIG. 5 represents a fourth embodiment of the present invention wherein a same rectangular section area can be given to the arm 7 and lug 9. While FIGS. 1 to 5 indicate the arms 7 extended from the outer periphery 8a of the base 8, instead, FIG. 6 indicates that the arms 7 may be extended from the inner periphery 8b of the base 8 in a fifth embodiment of the present invention. In this case, as shown in FIG. 7, the supports 6 have their Z-shaped section with the base 8, and the arms 7 have their L-shaped section. Otherwise, FIG. 8 shows a sixth embodiment of the invention wherein the spring portions 16 may be extended from the inner periphery 8b of the base 8 in an intersecting condition of the spring portion 16 in a projection view with the arms 7 extended from the outer periphery 8a of the base 8. In this way, the supports 6 and arms 7 can be extended from the outer periphery 8a or inner periphery 8b of the base 8 as necessary. FIG. 9 indicates a seventh embodiment of the invention with a table portion 17 formed with each arm 7 to mount the side rail 5 on the table portions 17 of each arm 7 and each spring portion 16. It will be appreciated that further modifications may be made to the foregoing embodiments of the present invention.

Accordingly, the worked mode of the instant invention can give rise to many advantages. Adoption of suitable section area, shape and length of the spring portion 16 and table portion 17 can realize a maximal rigidity and deflection of the support 6 to support the side rail 5. In particular, selection of the projecting length of the support 6 from the base portion 8 is effective to adjust the deflected amount of the support 6. Each support 6 of V-shape provides a given elasticity, rigidity and deflection in the sliding direction. During the upward stroke of the piston 2, the supports 6 of the spacer expander 4 can be resiliently deformed in the vertical direction to form between the side rail 5 and upper surface of the annular groove 10 the radial passage through which oil scraped by the side rail 5 can be drained. The flat bottom surface of the base 8 stably retains the space expander 4 on the bottom surface 12 of the annular groove 10 of the piston 2, reducing wear of the bottom surface 12 of the groove 10. The side rail 5 is resiliently outwardly urged by the lugs 9 formed in the arm 7 independently of the supports 6 so that the side rail 5 can be brought into close contact to the inner wall 13 of the cylinder 3 to provide sufficient seal to the inner wall 13, and it can follow deformation of the cylinder 3 at an elevated temperature. The oil control ring 1 can be made into a thin structure of two piece type because the supports 6 and arms 7 are integrally formed with the base 8 above the same side thereof.

Accordingly, the present invention can improve the follow-up property of the side rail in response to the thermal deformation of the inner wall of the cylinder, reduce oil consumption by restricting amount of oil supplied to the combustion chamber, and realize light weight and high speed engines by the thin oil control ring 1 of two piece type.

What is claimed are:

1. An oil control ring attachable in an annular groove (10) formed in a piston (2) for internal combustion engine, said oil control ring including a spacer expander (4) and a side rail (5) mounted thereon so that said spacer expander (4) elastically urges said side rail (5) toward an inner wall (13) of a cylinder (3);

said spacer expander (4) comprising a base (8), a plurality of supports (6) and a plurality of arms (7), said supports (6) and arms (7) being integrally formed with said base (8) to extend from an outer or inner periphery (8a, 8b) of said base (8);

said supports (6) resiliently urging said side rail (5) toward an upper surface (14) of said annular groove (10) of said piston (2);

each of said arms (7) provided with a lug (9) for resiliently urging said side rail (5) in radial and outward direction; and said spacer expander(4) has its Z section including said base (8) and supports (6).

2. The oil control ring of claim 1, wherein said support (6) comprises a spring portion (16) and a table portion (17);

said spring portion (16) being so compressed during the upward stoke of the piston (2) that an outer periphery (17a) of said table portion (17) is lowered below the inner periphery (17b) of said table portion (17) to maintain the inner periphery (5b) of said side rail (5) above the outer periphery (5a).

3. The oil control ring of claim 2, wherein said spring portions (16) of the supports (6) are extended from the outer or inner periphery (8a, 8b) of said base (8) in the intersecting condition in a projection view with said arms (7) extended from the outer or inner periphery (8a, 8b) of said base (8).

4. The oil control ring of claim 1, wherein the base (8) of said spacer expander (4) is in contact with a bottom surface (12) of said annular groove (10) of said piston (2), each of said supports (6) being formed into a V-shape which comprises a spring portion (16) and a table portion (17) connected with an end of said spring portion (16), said spring portion (16) obliquely extending from the outer or inner periphery (8a, 8b) of said base (8), said table portion (17) being substantially in parallel relation to the upper surface (14) of said annular groove (10) to uniformly urge said side rail (5) throughout the whole circumference toward the upper surface (14) of the annular groove (10), each of said arms (7) extending from the outer or inner periphery (8a, 8b) of said base (8) independently of said supports (6) so that said lugs (9) are in contact with the inner periphery (5b) of said side rail (5) to radially outwardly expand said side rail (5), and the outer periphery (5a) of said side rail (5) being radially protruded outwardly of said spacer expander (4).

* * * * *